(12) United States Patent
Forster et al.

(10) Patent No.: US 7,158,037 B2
(45) Date of Patent: Jan. 2, 2007

(54) LOW COST METHOD OF PRODUCING RADIO FREQUENCY IDENTIFICATION TAGS WITH STRAPS WITHOUT ANTENNA PATTERNING

(75) Inventors: Ian J. Forster, Chelmsford (GB); Scott Wayne Ferguson, Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 309 days.

(21) Appl. No.: 10/805,938

(22) Filed: Mar. 22, 2004

(65) Prior Publication Data

US 2005/0206524 A1 Sep. 22, 2005

(51) Int. Cl.
*G08B 13/14* (2006.01)
(52) U.S. Cl. .............................. 340/572.8; 340/572.1; 29/829
(58) Field of Classification Search ............ 340/572.1, 340/572.2, 572.3, 572.4, 572.5, 572.6, 572.7, 340/572.8, 572.9; 29/829; 156/60; 174/255, 174/260, 261
See application file for complete search history.

(56) References Cited

U.S. PATENT DOCUMENTS

| | | |
|---|---|---|
| 3,724,737 A | 4/1973 | Bodnar |
| 3,989,575 A | 11/1976 | Davies et al. |
| 5,006,856 A | 4/1991 | Benge et al. |
| 5,153,983 A | 10/1992 | Oyama |
| 5,564,888 A | 10/1996 | Doan |
| 5,585,193 A | 12/1996 | Josephy et al. |
| 5,597,640 A | 1/1997 | Van Erden et al. |
| 5,606,136 A | 2/1997 | Kropp |
| 5,660,787 A | 8/1997 | Van Erden et al. |
| 5,688,536 A | 11/1997 | Van Erden et al. |
| 5,707,660 A | 1/1998 | Van Erden et al. |
| 5,837,349 A | 11/1998 | Van Erden et al. |
| 6,019,865 A | 2/2000 | Palmer et al. |
| 6,100,804 A * | 8/2000 | Brady et al. ............. 340/572.7 |

(Continued)

FOREIGN PATENT DOCUMENTS

EP 0 979 790 9/2000

(Continued)

*Primary Examiner*—Anh V. La
(74) *Attorney, Agent, or Firm*—Renner, Otto, Boisselle & Sklar LLP

(57) ABSTRACT

A web of radio frequency identification (RFID) devices includes a conductive layer atop an insulating layer, the conductive layer having one or more apertures therein. Alternatively, the web may not include an insulating layer. RFID chips or straps are electrically coupled to portions of the conductive layer on either side of an aperture, for use as antennas when the RFID devices are separated from one another, as by cutting. The apertures may be formed by creasing portions of the web, and removing parts of the creased portion. There may be one or more apertures in a longitudinal or transverse direction of the web. The antenna shapes of various of the RFID devices may be tessellated, nesting within one another or having the same boundary, thereby improving efficiency by using substantially all of the conductive material. The RFID devices may be tested and/or programmed while remaining in the web format.

62 Claims, 13 Drawing Sheets

U.S. PATENT DOCUMENTS

| | | |
|---|---|---|
| 6,107,920 A * | 8/2000 | Eberhardt et al. ....... 340/572.7 |
| 6,145,901 A | 11/2000 | Rich |
| 6,215,401 B1 | 4/2001 | Brady et al. |
| 6,278,413 B1 | 8/2001 | Hugh et al. |
| 6,542,114 B1 | 4/2003 | Eagleson et al. |
| 6,888,502 B1 * | 5/2005 | Beigel et al. ........ 343/700 MS |
| 6,891,110 B1 * | 5/2005 | Pennaz et al. .............. 174/260 |
| 6,925,701 B1 * | 8/2005 | Eckstein et al. ........... 29/602.1 |
| 2002/0062898 A1 | 5/2002 | Austin et al. |
| 2003/0089444 A1 | 5/2003 | Melzer et al. |
| 2003/0136503 A1 | 7/2003 | Green et al. |
| 2004/0041262 A1 | 3/2004 | Okamoto et al. |

FOREIGN PATENT DOCUMENTS

| | | |
|---|---|---|
| WO | 82/00541 | 2/1982 |
| WO | 03/065782 | 8/2003 |

* cited by examiner

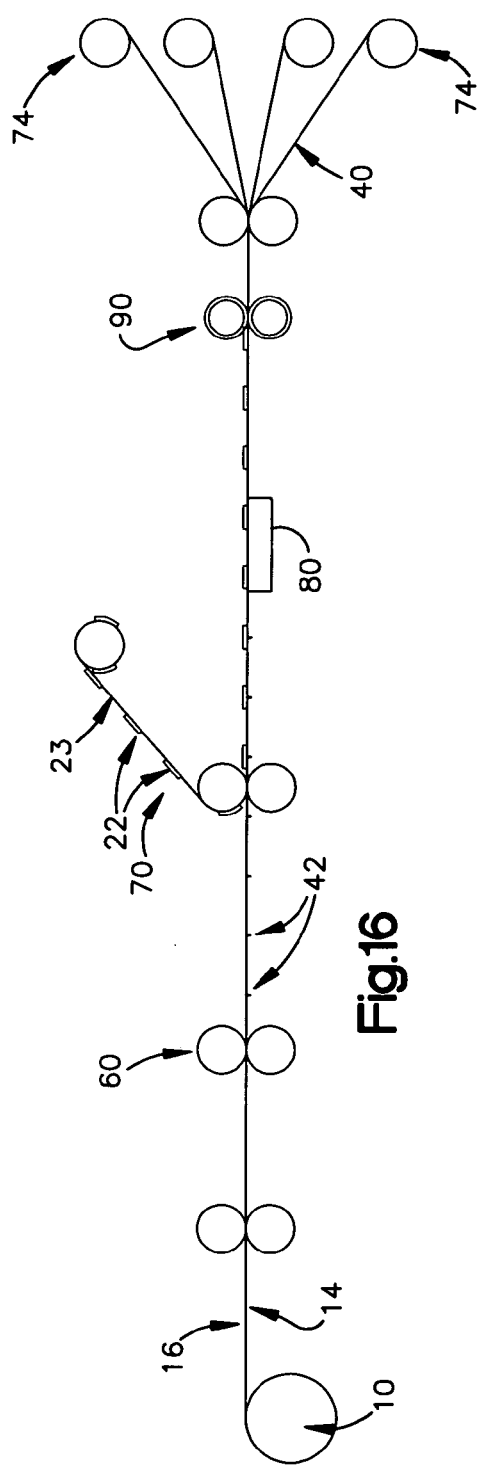
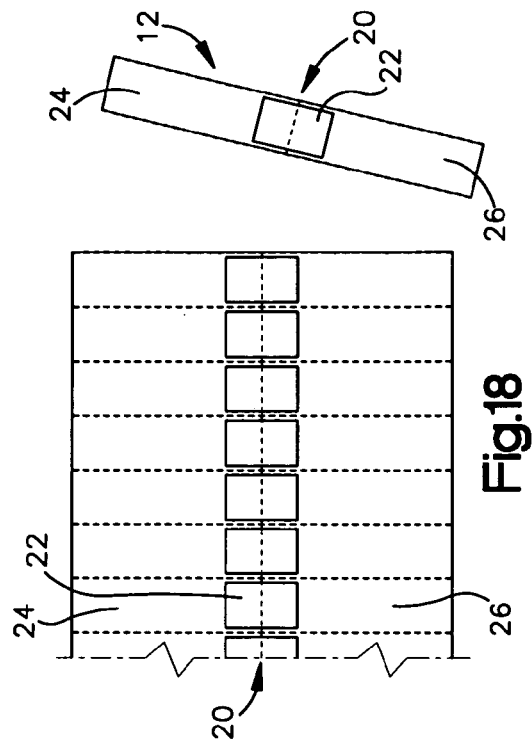
Fig. 16
Fig. 17
Fig. 18

LOW COST METHOD OF PRODUCING RADIO FREQUENCY IDENTIFICATION TAGS WITH STRAPS WITHOUT ANTENNA PATTERNING

BACKGROUND OF THE INVENTION

1. Field of the Invention

This invention relates to the field of Radio Frequency Identification (RFID) tags and labels, and in particular to a method of producing such tags and devices without antenna patterning.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that are adhesively or otherwise attached directly to objects. RFID tags, in contrast, are secured to objects by other means, for example by use of a plastic fastener, string or other fastening means.

Typically, RFID devices are produced by patterning, etching or printing a conductor on a dielectric layer and coupling the conductor to a chip. These structures furthermore should be able to flex when supported at one or more ends. It is important therefore to avoid materials and constructions that add undue thickness or stiffness to the RFID tag. Considering the requirements of thinness and flexibility, conductors such as wirebonds and metal lead frame are unsuitable, as are related materials such as epoxy encapsulation, and thinner conductors are desirable (such as printed conductive inks).

RFID devices on the other hand should have adequate electrical connections, mechanical support, and appropriate positioning of the components (chips, chip connectors, antennas). Structures for these purposes can add complexity, thickness and inflexibility to the RFID device. For example, layers in addition to the dielectric substrate/connectors are sometimes added to position the radio frequency circuit and antenna in three dimensions to provide electrical bonds between the various conductors. The antenna and connecting conductors often require more than one plane of electrical wiring, i.e. the designs may use cross-overs and stacking of components.

One type of structure that may carry chips and chip connectors for incorporation in RFID devices is a "strap" or "interposer", as disclosed for example in U.S. Pat. No. 6,606,247 or in European Patent Publication 1 039 543, both of which are incorporated by reference herein in their entireties.

Another consideration is efficiency of manufacture of RFID devices. When using thin deposited or etched conductors, the precision and definition of the printed elements of lines and spaces may be important to the performance of the tabs and the overall RFID device. Conventional patterning, etching and printing methods may not provide adequate resolution, line/space separation or other qualities necessary to deliver engineered performance. In addition, methods of manufacturing RFID devices that include combining a web of RFID chips or straps with a web of formed or printed RFID antennas are complicated by the need to account for any differences in the pitch of each web, or spacing between adjacent element on each web, so that the RFID chips or straps and antennas are aligned. Further details regarding indexing of RFID strap webs may be found in co-owned U.S. Patent Application 2003/0136503 A1, which is herein incorporated by reference in its entirety. It is also desirable from a manufacturing perspective to reduce complexity and manufacturing steps in RFID device designs, and to make efficient use of component materials (reduce waste).

Moreover, while RFID tags and labels are inexpensive, and costs of RFID devices have been going down, the size and cost of such devices may make them impractical for use with small or inexpensive items. Therefore it is important to achieve the properties described above, especially for thin flexible RFID tags and labels, through cost-effective manufacture of such devices.

From the foregoing it will be seen there is room for improvement of RFID devices and manufacturing processes relating thereto.

SUMMARY OF THE INVENTION

According to an aspect of the invention, a web includes a conductive layer atop an insulating layer, the conductive layer having one or more apertures therein to create suitable coupling points. Alternatively, the web may not include an insulating layer. The web includes a plurality of radio frequency identification (RFID) devices, with each of the devices including a pair of antennas that are areas or sections of the conductive material, and an RFID chip or strap across one of the one or more apertures or lines of apertures, electrically coupled to the antennas. The antennas of various of the RFID devices may be tessellated with one another, with antennas of different devices having complementary shapes wherein the boundary of one of the antennas is also the boundary of an adjacent antenna. According to various specific embodiments, the webs may have rectangular shapes, curved shapes such as sinusoidal shapes, generally triangular shapes, or other shapes.

According to another aspect of the invention, a web includes a conductive layer atop an insulating layer, the conductive layer having an aperture in the longitudinal or length direction of the web. The web includes a plurality of radio frequency identification (RFID) devices, with each of the devices including a pair of antennas that are areas or sections of the conductive material, and an RFID chip or strap across the aperture.

According to yet another aspect of the invention, a web includes a conductive layer atop an insulating layer, the conductive layer having a plurality of apertures in a transverse or width direction of the web. The web includes a plurality of radio frequency identification (RFID) devices, with each of the devices including a pair of antennas that are areas or sections of the conductive material, and an RFID chip or strap across one of the apertures, between the areas or sections.

According to still another aspect of the invention, a web includes a conductive layer atop an insulating layer, the web including one or more folds or creases therein to produce one or more corresponding apertures in the conductive layer. RFID chips or straps may be placed across an aperture to form a plurality of RFID devices, with each chip or strap electrically coupled to sections of the conductive layer that serve as antenna elements. The one or more apertures may be in a longitudinal direction (in the length or long direction of the web) or may be in a transverse direction (in the width or short direction of the web).

According to a further aspect of the invention, a method of making RFID devices may include placing RFID chips or straps across one of one or more apertures in a conductive layer of a web of material, thereby electrically coupling the RFID chips or straps to sections of the conductive layer on opposite sides of the aperture. The sections of the conductive layer serve as antennas of the RFID devices, when the RFID devices are separated from one another, as by cutting. According to one embodiment of the invention, the method may also include forming the one or more apertures. According to one specific embodiment of the invention, the forming may include folding or creasing various portions of the web, and removing a part of the folded portion, as by cutting, to create discontinuities in the conductive portions, to thereby form the one or more apertures.

According to an aspect of the present invention, an RFID device is produced by a low cost method of manufacture utilizing conventional roll-to-roll manufacturing technology. Specifically, the present invention provides a method of making an RFID device from a web material including a conductive layer having one or more apertures and a continuous dielectric layer. The method comprises the steps of providing a web material including a continuous conductive layer and a continuous dielectric layer, forming at least one crease portion in the web material, the crease portion including a central portion of overlapped web material between adjacent portions of single ply web material, forming an aperture in the conductive layer by removing at least part of the central portion of the at least one crease portion; and applying at least one strap across the crease portion. The aperture aids in creating suitable coupling points for the strap to the antenna.

According to another aspect of the present invention, a method of making an RFID device includes the steps of: providing a web material including a continuous conductive layer and a continuous dielectric layer; forming at least one aperture in the conductive layer; and applying at least one strap across the at least one aperture.

According to yet another aspect of the present invention, a method of making an RFID device includes the steps of: providing a web material including a continuous conductive layer and a continuous dielectric layer; forming at least one crease portion in the web material, the crease portion including a central portion of overlapped web material between adjacent portions of single ply web material; forming an aperture in the conductive layer by removing at least part of the central portion of the at least one crease portion; and applying at least one strap across the crease portion.

According to still another aspect of the present invention a web of RFID devices is provided comprising: a web material having a conductive layer and a dielectric layer; at least one aperture in the conductive layer forming at least two separate conductor portions; at least one RFID device, including a strap attached across the aperture, and coupled to a conductor portion on each side of the aperture.

According to still another aspect of the present invention a web of RFID devices is provided comprising: a conductive web material, at least one aperture in the conductive web material forming at least two separate conductor portions, and at least one RFID device. The RFID device includes a strap attached across the aperture and coupled to a conductor portion on each side of the aperture.

According to yet another aspect of the invention a method of making an RFID device is provided comprising the steps of: providing a web of conductive material, forming at least one aperture in the web of conductive material, and applying at least one strap across the at least one aperture.

According to yet another aspect of the invention a method of testing a web of RFID devices is provided comprising the steps of: providing a web of RFID devices, cutting a slit in the web on opposite sides of an RFID device, wherein the slits partially separate a central portion of the RFID device from the web of RFID devices, deflecting the central portion of the RFID device from the plane of the web, and testing the RFID device.

According to still another aspect of the invention, a method of programming a web of RFID devices is provided comprising the steps of: providing a web of RFID devices, cutting a slit in the web on opposite sides of an RFID device, wherein the slits partially separate a central portion of the RFID device from the web of RFID devices, deflecting the central portion of the RFID device from the plane of the web, and programming the RFID device.

According to another aspect of the invention, in a preferred embodiment the dielectric layer and conductive layers together comprise a thin, flexible sheet material. In this embodiment the layers are sufficiently flexible to be folded or formed in a roll.

According to a further aspect of the invention, a web of conductive material has one or more apertures therein, thereby creating suitable connect points on the conductive material, on opposite sides of at least one of the apertures, for coupling of an RFID strap or interposer to the conductive layer. The coupling of the RFID strap or interposer to the conductive material may be either in a direct electrically conductive electrical connection, or alternatively may involve capacitive coupling. The one or more apertures may electrically isolate the conductive material coupled to opposite sides of the RFID strap or interposer. Alternatively, the one or more apertures may still leave one or more continuous bridges of conductive material between the conductive material coupled to opposite side of the RFID strap or interposer, while still creating suitable coupling points on the conductive material for coupling of the RFID strap or interposer. The apertures may have any of a variety of suitable shapes. In addition, the apertures may be formed in any of a variety of suitable ways, such as (for example) by folding and cutting, laser ablation, etching, or selective deposition of conductive material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale,

FIG. 16 shows a system for making a web of RFID devices as in FIG. 6;

FIG. 17 is an oblique view of a web of RFID devices according to another embodiment of the present invention;

FIG. 18 is a plan view of a web of RFID devices, as shown in FIG. 17, being cut into individual RFID devices;

DETAILED DESCRIPTION

A web of radio frequency identification (RFID) devices includes a conductive layer atop an insulating layer, the conductive layer having one or more apertures therein. RFID chips or straps are electrically coupled to portions of the conductive layer on either side of one or more apertures, for use as antennas when the RFID devices are separated from one another, as by cutting.

The apertures may be formed by folding or creasing portions of the web, and removing parts of the folded or creased portion as set forth herein. The apertures may also be formed by a selective masking and evaporation process, or by any other suitable means. There may be a single aperture in a longitudinal direction of the web, or multiple apertures in a longitudinal or transverse direction of the web. The apertures may fully separate the conductive material on either side, or alternatively may only partially separate the conductive material, leaving one or more conductive bridges linking the conductive material on both sides of the apertures. The shapes of the antennas of various of the RFID devices may be tessellated, nesting within one another or having the same boundary, thereby improving efficiency by using substantially all of the conductive material. The web may be cut into strips each containing a line of RFID devices, which may then be placed on or in individual objects. The web also may be combined with one or more additional layers or structures, such as protective layers or printable layers, in forming RFID devices.

Figure 1:
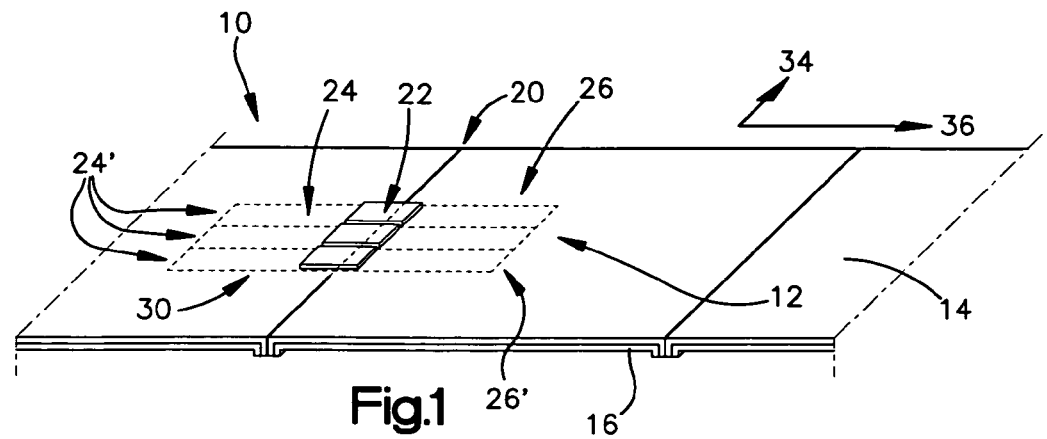
FIG. 1 is an oblique view of a web of RFID devices of the present invention.

Referring initially to FIG. 1, a web 10 includes a plurality of radio frequency identification (RFID) devices 12. The web 10 includes an electrically-conductive layer or material 14 atop an electrically-insulating layer or substrate 16. As used herein, "conductive" means electrically conductive, and "insulating" and "non-conductive" mean electrically non-conductive. In the embodiment shown in FIG. 1, the conductive layer 14 has a plurality of apertures 20 therein. RFID straps, interposers, or chips 22 are each placed across one of the apertures 20, with the RFID straps (interposers) 22 electrically coupled to portions 24 and 26 of the conductive layer 14 on either side of the aperture 20. The RFID straps 22 may be attached to portions 24 and 26 in any number of different ways, such as soldering, or bonding with a conductive or nonconductive adhesive. When the RFID devices 12 are separated from one another, such as by one or more cutting operations, the portions 24 and 26 serve as antennas for the RFID devices 12.

The RFID straps or interposers 22 may be any of a variety of combinations of wireless communication devices (RFID chips) with conductive leads coupled thereto to facilitate electrical connection. The term "strap," as used herein, may refer to an integrated circuit (IC) chip, electrical connectors to the chip, and strap leads coupled to the electrical connectors. A strap also may include a strap substrate, which may support other elements of the strap, and may provide other characteristics such as electrical insulation. The strap may be elongate, as the strap leads extend from the IC chip. The strap may be flexible, rigid, or semi-rigid. It will be appreciated that a variety of strap configurations are available for coupling to the antennas 34 and 36. Examples include an RFID strap available from Alien Technologies, and the strap marketed under the name I-CONNECT, available from Philips Electronics. The term "strap" broadly includes chip carriers such as interposers. Chips available from Alien Technologies may be attached either conductively, in a flip-chip die, or conductively or reactively for a strap form of the chip. Suitable RFID chips include the Philips HSL chip, available from Philips Electronics, and the EM Marin EM4222, available from EM Microelectronic-Marin SA, as well as RFID chips available from Matrics Inc. of Columbia, Md. USA. RFID tags with adaptive elements may also be used, such as the RFID tags described in U.S. Provisional Application No. 60/517,156, filed Nov. 4, 2003, which is hereby incorporated by reference.

As noted above, the RFID straps 22 may be coupled to the antenna portions 24 and 26 by any of a variety of suitable methods, such as, for example, by use of a conductive or non-conductive adhesive, by use of welding and/or soldering, or by electroplating. Thus the straps 22 may be conductive coupled to the antenna portions 24 and 26 directly, through continuous contact of electrically conductive material. Alternatively, the electrically coupling between the straps 22 and the antenna portions 24 and 26 may be capacitive or inductive, across a layer of non-conductive material. For example, a non-conductive adhesive or glue may be used to adhere the straps 22 to the antenna portions 24 and 26, with capacitive or inductive electrically coupling occurring across the layer of non-conductive material.

The straps or interposers 22 are coupled to the antenna portions 24 and 26 at suitable attach or connect points 24' and 26' on the antenna portions 24 and 26. The attach or connect points 24' and 26' on the antenna portions 24 and 26 may be selected so as to achieve desired operative coupling between the straps or interposers 22, and the antenna portions 24 and 26. For instance, the attach or connect points 24' and 26' may be selected such that the impedance across the attach or connect points 24' and 26' is the complex conjugate of the impedance of the chip of the strap or interposer 22 that is connected across the aperture 20. However, the attach points 24' and 26' may be selected to achieve some mismatch in impedance, between the antenna portions 24 and 26, and the straps or interposers 22.

The insulating layer 16 may be a layer of a suitable non-conductive polymer material, such as polyester. The thickness of the insulating layer 16 will depend on the physical properties of the specific material chosen and the desired mechanical strength of the overall device. A typical range of thickness for the insulating layer may be 50 µm to 125 µm. The conductive layer 14 may be a suitable metal material, such as copper or aluminum. Conductive metal may be deposited on an insulating material by any of a variety of suitable deposition methods. Indeed, it will be appreciated that commercially-available metallized polyester may be utilized for the web 10. Alternatively, the conductive material may be other sorts of material, such as a conductive ink printed or sprayed on the insulating layer 16.

It will be appreciated that the RFID devices 12 may have other layers and/or structures. For example, the RFID device 12 may have an adhesive layer for use in adhering the RFID device 12 to an object. The adhesive layer may have a peel layer thereupon for protecting the adhesive prior to use. The RFID device 12 may also have other layers, such as protective layers, and/or a printable layer for printing information thereupon. It will be appreciated that the RFID device 12 may also include additional suitable layers and/or structures, other than those mentioned herein.

The shapes of the antenna portions 24 and 26 may be tessellated, with antenna portions of adjacent of the RFID devices 12 sharing common boundaries 30. This tessellation of the antenna portions 24 and 26 may allow for increased utilization of the material in the conductive layer 16, reducing wastage of the conductive material. The tessellation of the shapes of the antenna portions 24 and 26 may also allow for reduction in the number and/or complexity of the cutting operations required to separate the individual RFID devices 12.

The portions 24 and 26 shown in FIG. 1 are rectangular in shape, but it will be appreciated that a wide variety of suitable tessellated shapes may be utilized for the portions 24 and 26, for example including curved and/or straight lines for the boundaries 30. The antenna portions 24 and 26 may have any of a wide variety of suitable polygonal or other shapes, for example having sinusoidal shapes or saw-tooth shapes. The tessellated shapes may be symmetric or asymmetric, and may repetitively use a given shape or set of multiple shapes for antenna portions 24 and 26. A few of these alternative tessellated shapes are described below, but it will be appreciated that many other tessellated shapes are possible.

It will also be appreciated that the portions 24 and 26 may alternatively have shapes that are not fully tessellated, in part or in full not sharing boundaries with the antenna portions 24 and 26 of other of the RFID devices 12. However, tessellating the antenna portions 24 and 26 of various of the RFID devices 12 may result in more efficient use of the web material, which may reduce material costs and thus the cost of the RFID devices 12.

The shapes of the portions 24 and 26 may have characteristics related to their performance with the RFID strap 22. For example, it may be advantageous from a performance standpoint for the antenna portions 24 and 26 to have shapes such that a longitudinal centerline of the antenna portions 24 and 26 may be substantially equidistant from opposite borders of the antenna portions 24 and 26.

As will be explained in greater detail below, the apertures 20 may be made in any of a variety of suitable ways. The apertures 20 may be locations where the conductive material is either not deposited in the first place, by use of a selective masking and deposition or evaporation process, or is selectively removed after deposition, such as by use of a suitable etching process. Alternatively, the apertures 20 may be parts of the web 10 which have been folded or creased in order to create a discontinuity in the conductive layer 14. The apertures 20 may also be formed by die-cutting a strip of the conductive layer 14 and removing the strip to create an aperture in the conductive layer 14. The apertures 20 may fully electrically separate conductive material on either side. Alternatively, there may be some conductive bridging across the apertures 20, for instance to facilitate preventing undesirable effects from static electricity.

In the configuration shown in FIG. 1, the apertures 20 are in a transverse direction 34 of the web 10, transverse to a longitudinal direction 36 of the web 10. The web 10 may be cut or sliced at appropriate locations in the longitudinal direction 36, to create a number of strips 40, each including a plurality of the RFID devices 12, and each having a width of one of the RFID devices 12. The strips 40 may be placed on individual rolls, and utilized as described in greater detail below.

Figure 2:
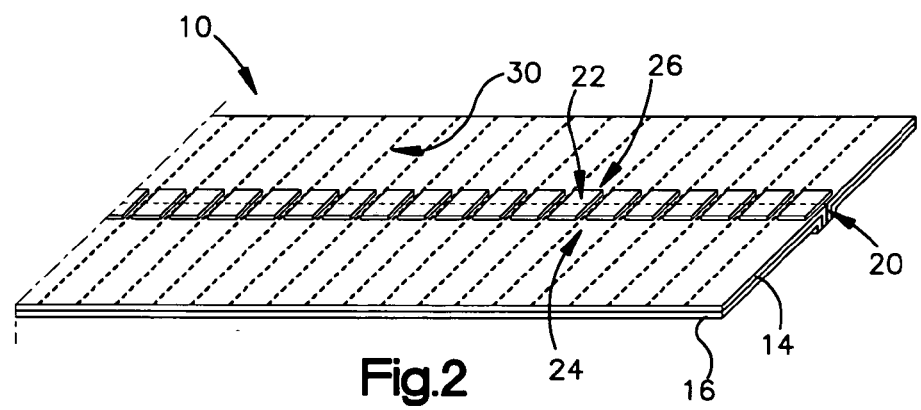
FIG. 2 is an oblique view of a web of RFID devices according to another embodiment of the present invention.

FIG. 2 shows an alternative embodiment of the web 10, which has a single aperture 20 in the longitudinal direction 36. This embodiment may have advantages over the embodiment shown in FIG. 1. For instance, the overall process of forming a longitudinal aperture may be more efficient than forming a transverse aperture because the manufacturing process can be a continuous process. The web 10 includes a plurality of radio frequency identification (RFID) devices 12. The web 10 further includes an electrically-insulating layer or substrate 16 atop an electrically-conductive layer or material 14. In the embodiment shown in FIG. 2, the conductive layer 14 has a single aperture 20 therein. RFID straps or chips 22 are each placed across the aperture 20, with the RFID straps 22 electrically coupled to portions 24 and 26 of the conductive layer 14 on either side of the aperture 20. When the RFID devices 12 are separated from one another, such as by one or more cutting operations, the portions 24 and 26 serve as antennas for the RFID devices 12.

Figure 3:
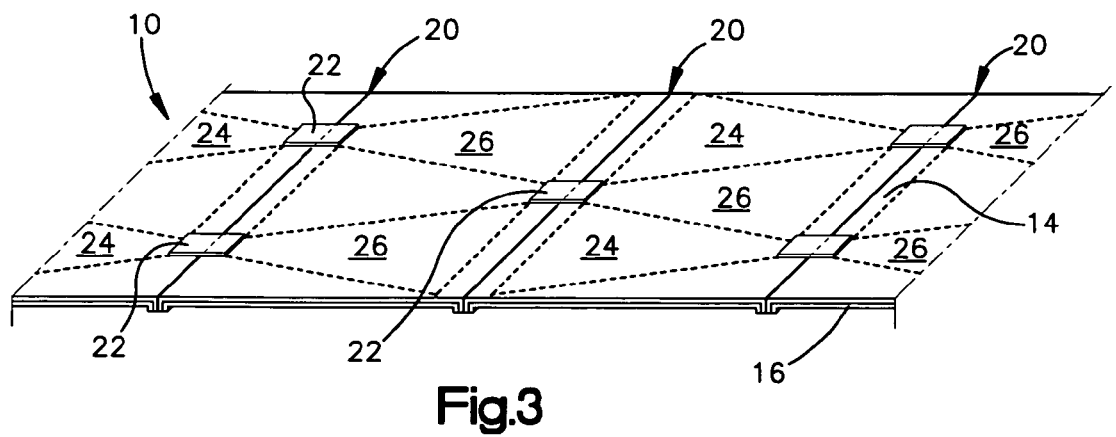
FIG. 3 is an oblique view of a web of RFID devices in a partially tessellated configuration.

As mentioned above, the antenna portions 24 and 26 may take a variety of shapes. For example, turning to FIG. 3, a web 10 is shown including a plurality of RFID devices 12. Similar to the embodiment shown in FIG. 1, the apertures 20 are in a transverse direction of the web. The antenna portions 24 and 26 of the RFID devices 12 are shown in a staggered configuration having a bow-tie shape. In this embodiment, the portions 24 and 26 are partially tessellated, partially sharing boundaries with the antenna portions 24 and 26 of other of the RFID devices 12.

Figure 4:
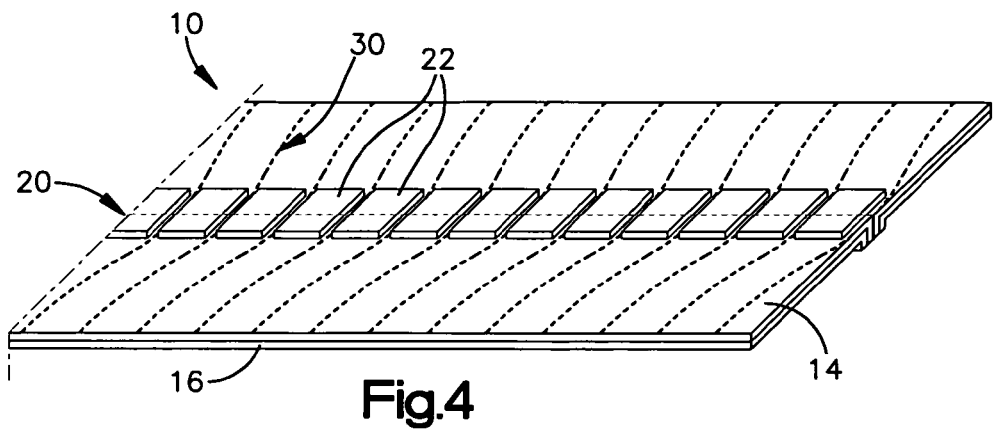
FIG. 4 is an oblique view of a web of RFID devices in a fully tessellated configuration.

FIG. 4 shows a fully tessellated configuration of RFID devices 12. In this embodiment, there is a single aperture 20 extending in the longitudinal direction 36 of the web material. The antenna portions 24 and 26 are shown having a sinusoidal-like shape that is fully tessellated. Thus, the antenna portions 24 and 26 share complete boundaries with the antenna portions 24 and 26 of other of the RFID devices 12.

Figure 5:
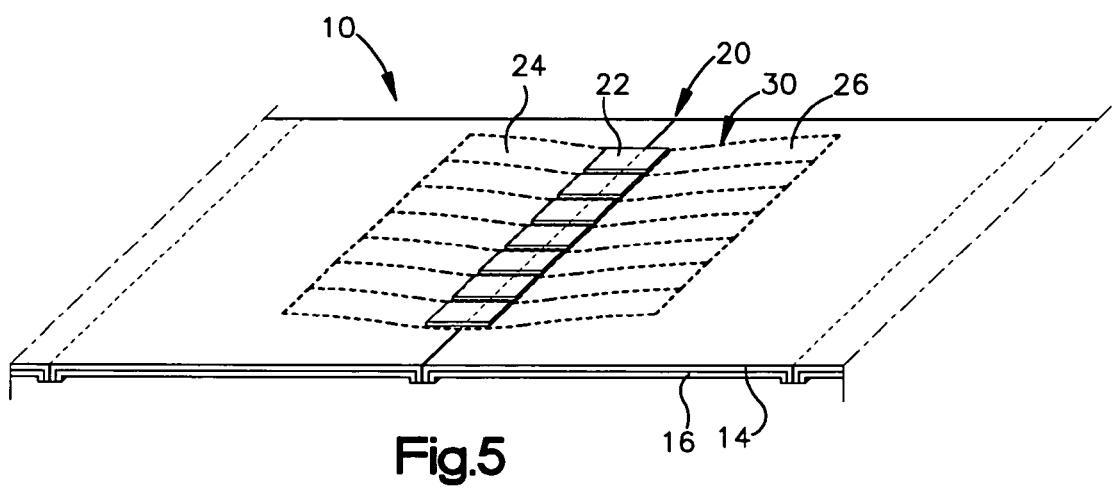
FIG. 5 is an oblique view of a web of RFID devices in another fully tessellated configuration.

Similarly, FIG. 5 shows a fully tessellated configuration of RFID devices 12 wherein the antenna portions 24 and 26 are shown having a sinusoidal-like shape.

Figure 6:
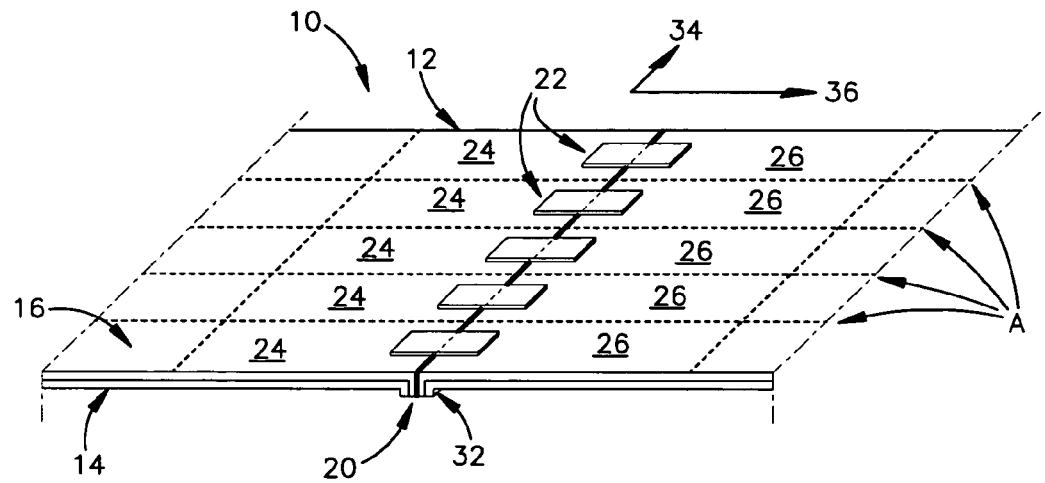
FIG. 6 is an oblique view of a web of RFID devices wherein the conductor apertures extend in the transverse direction of the web material.

Turning now to FIG. 6, a web 10 of RFID devices 12 produced by a method of the present invention is shown. In this embodiment, the RFID devices 12 are oriented in the longitudinal direction 36 of the web material 10. The web material includes an electrically-conductive layer or material 14 and an electrically-insulating layer or substrate 16. A plurality of apertures 20 extend across the web material 10 in the transverse direction 34 and a plurality of RFID chips 22, or straps, are attached to the web material 10 across the apertures 20, and electrically coupled to the conductive layer 14. As shown in FIG. 6, the straps are attached to the electrically-insulating layer 16 and capacitively or otherwise coupled to the electrically-conductive layer 14. Alternatively, the straps may be attached directly to the electrically-conductive layer 14, with each lead of the strap attached to the electrically-conductive layer 14 on a respective side of the aperture 20.

In FIG. 6, the apertures 20 are formed by creasing the web material 10 thereby creating a central portion of overlapped web material 32 between adjacent portions of single ply web material. The central portion of overlapped web material 32 includes a portion wherein the dielectric layer 16 has been folded upon itself. At least a part of the central portion of overlapping web material 32 is then removed, forming an aperture 20 in the conductive layer.

Specifically, the removal of at least part of the central portion of overlapping web material 32 creates an aperture 20 in the conductive layer 14. The aperture 20 in the conductive layer 16 is formed by removing the lower section of the central portion of the overlapping web material 32, leaving the upper section of the central portion of overlapping web material 32 where the dielectric layer 16 is folded upon itself separating the conductive layer 14. In this manner two separate antenna portions 24 and 26 are formed, one on each side of the aperture 20, when the RFID device 12 is cut from the web material 10.

Figure 7:
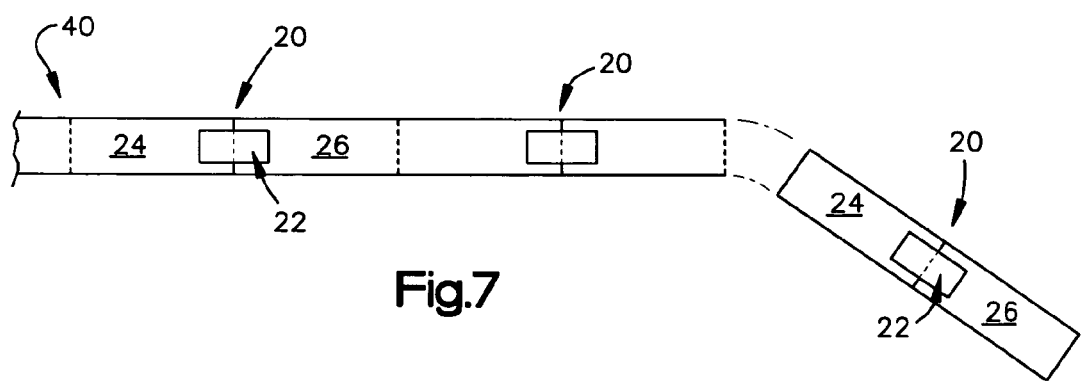
FIG. 7 is a top view of a strip of end-to-end aligned RFID devices.

In this embodiment, the RFID devices 12 are formed end-to-end along the length of the web material 10, and adjacent to one another across the width of the web material 10 in a plurality of rows. To form an individual RFID device 12, the web material 10 is cut along the longitudinal axis 36 at dashed lines A, thereby forming a plurality of strips 40 of RFID devices 12 interconnected as shown in FIG. 7. A strip 40 of end-to-end aligned RFID devices 12 may then be cut into individual RFID devices 12, or tags.

Figure 8:
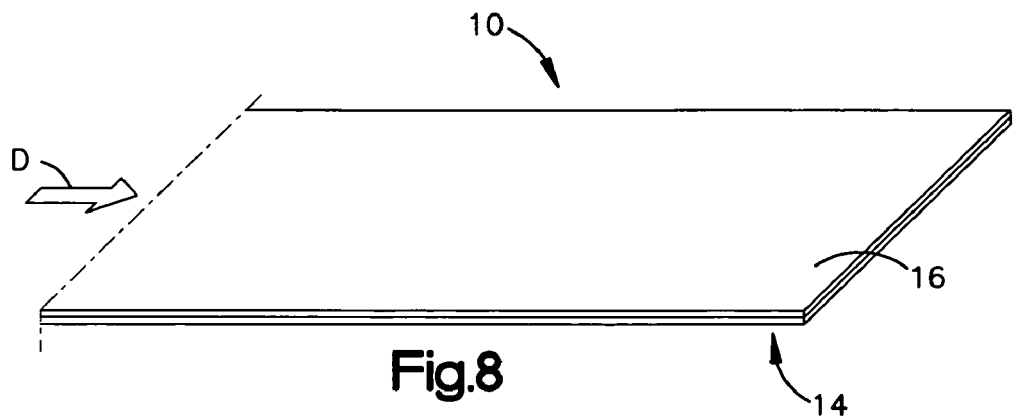
FIG. 8 is an oblique view of a sheet of web material.
Figure 9:
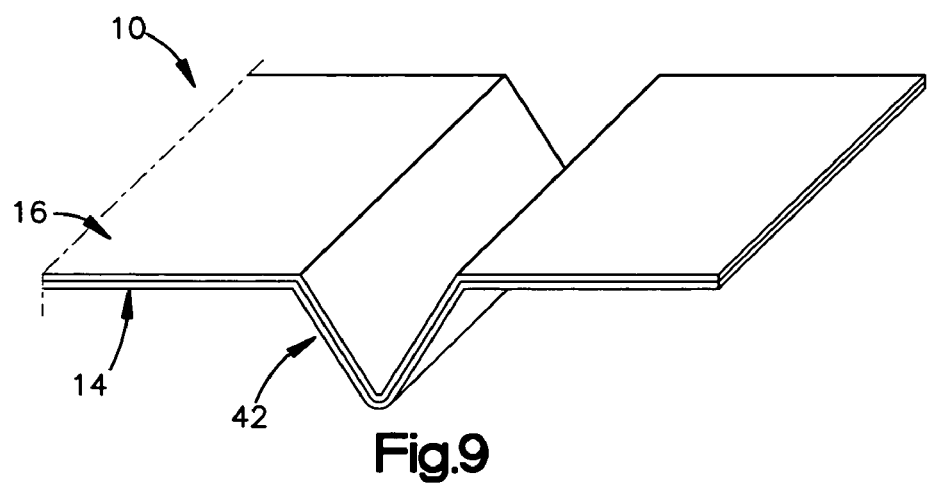
FIG. 9 is an oblique view of a partially transversely creased web material.
Figure 10:
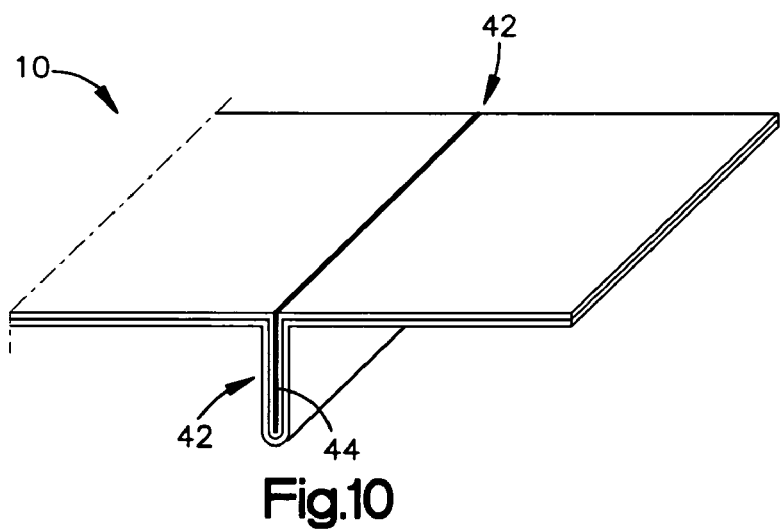
FIG. 10 is an oblique view of a fully creased web material.
Figure 11:
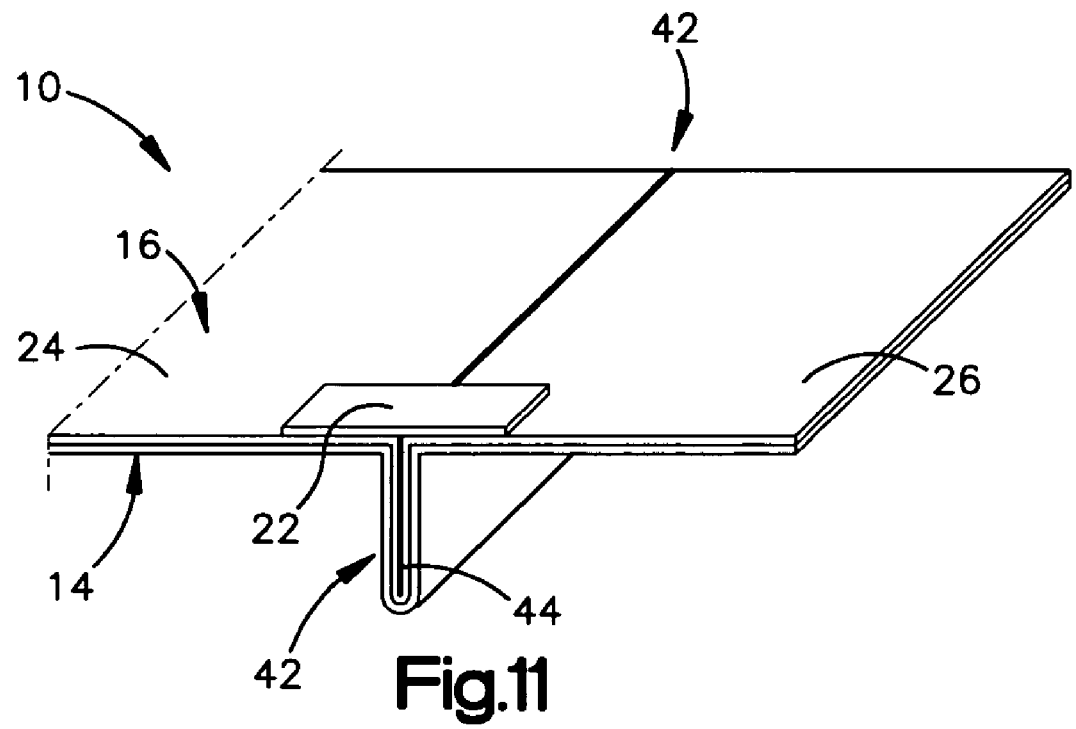
FIG. 11 is an oblique view of a fully creased web material with straps.

FIGS. 8–15 illustrate a method for manufacturing an RFID device and/or web of RFID devices according to the embodiment of FIG. 6. In FIG. 8, a web material 10 having a continuous conductive layer 14 and a continuous dielectric layer 16 is shown. In FIG. 9, a crease 42 is shown partially formed in the transverse direction 34 of the web. In the illustrated embodiment a single crease 42 is shown. However, a plurality of transverse creases 42 may be formed as appropriate to maximize the efficiency of the manufacturing process. As shown in FIG. 10, the transverse crease 42, including a central portion of overlapped web material 44 between adjacent portions of single ply web material, is fully formed. This structure may be held together by a suitable adhesive or crimped with heat and pressure. RFID chips 22, or straps are then applied across the crease 42 as shown in FIG. 11 and coupled to the conductive layer 14 on each side of the crease 42. The RFID chips 22, or straps, are typically applied across the entire width of the web 10, and are attached to the web with a suitable adhesive.

Figure 12:
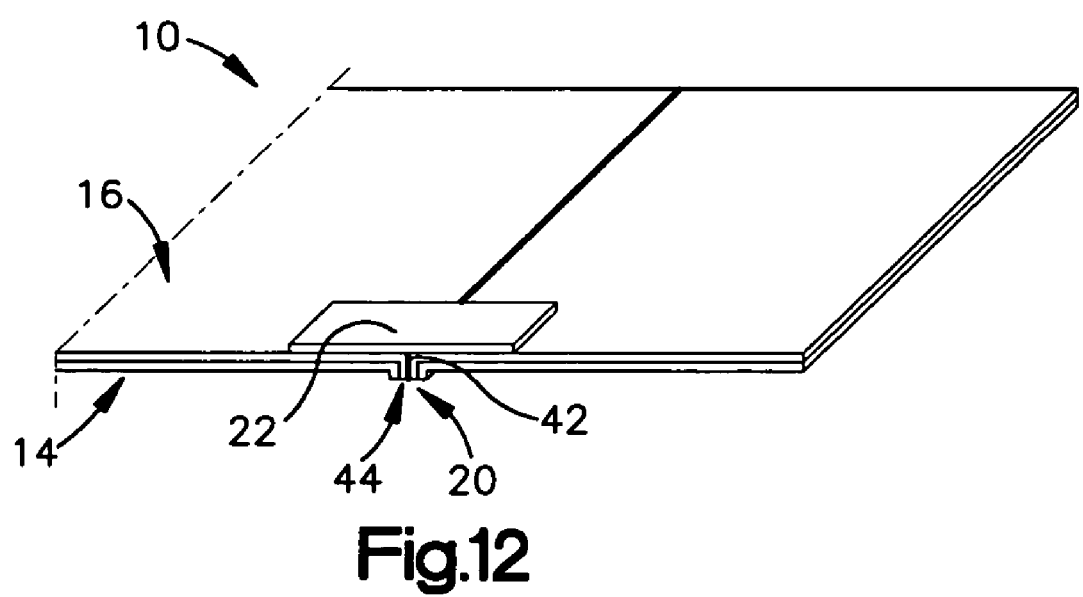
FIG. 12 is an oblique view of a web material having an aperture in the conductive layer and a strap coupled to the conductive material across the aperture.
Figure 13:
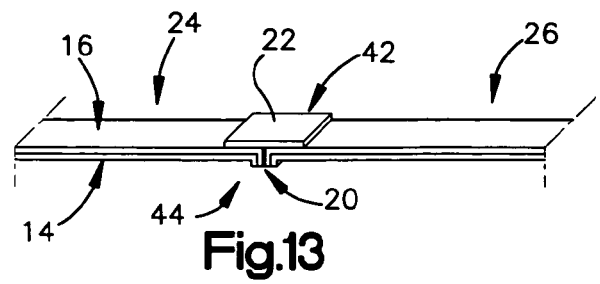
FIG. 13 is an oblique view of a single RFID device according to the present invention.

Turning to FIGS. 12 and 13, an aperture 20 in the conductive layer 14 is formed by removing at least part of the central portion of overlapping web material 44. Preferably, a sufficient amount of the lower section of the central portion of overlapping web material 44 is removed so that the remaining central portion of overlapping web material is flush with the conductive layer 14, thereby forming a flat structure. However, only the lowermost section of the central portion of overlapping web material 44, consisting of only the conductive layer 14, need be removed to create the aperture 20 in the conductive layer 14.

Figure 14:
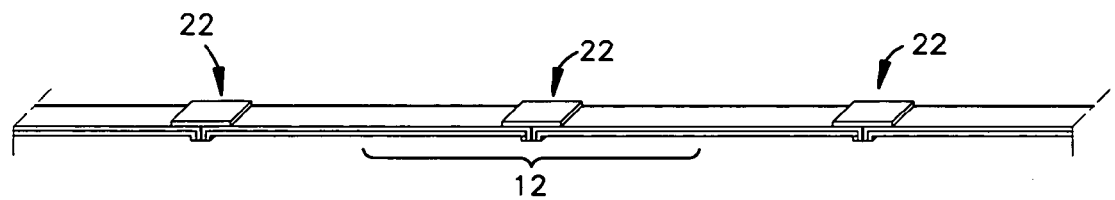
FIG. 14 is an oblique view of a strip of end-to-end aligned RFID devices according to the present invention.
Figure 15:
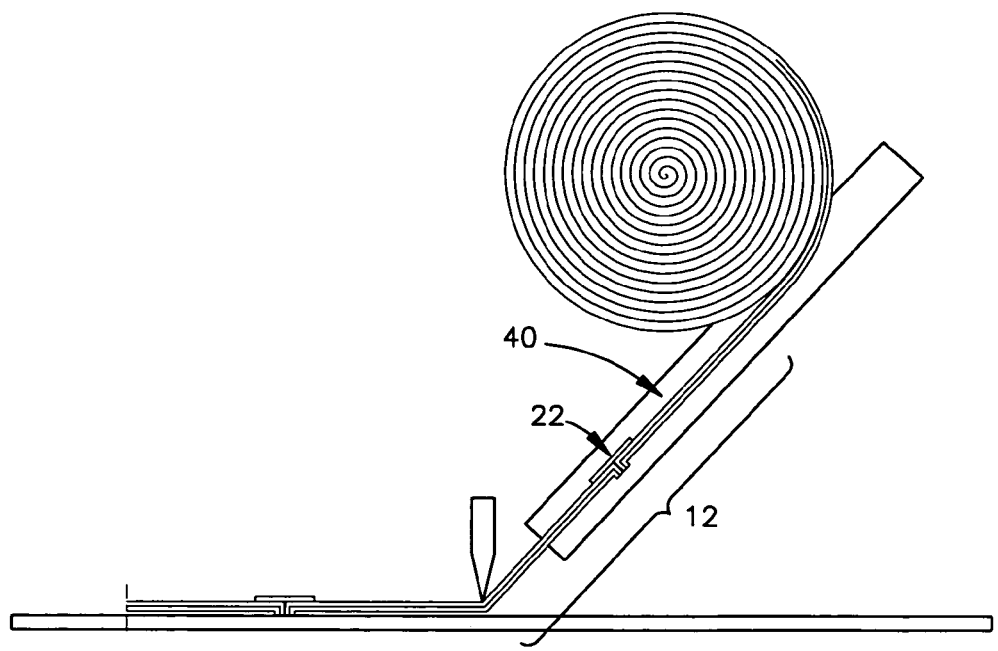
FIG. 15 shows a strip of end-to-end aligned RFID devices being cut into individual RFID devices.

At this point in the manufacturing process, the web material 10 comprises a plurality of RFID devices 12 extending across the width of the web material and arranged in an end-to-end configuration along the length of the web material 10 as seen in FIG. 6. The web material 10 is then cut in the longitudinal direction 36 between the rows of end-to-end aligned RFID devices 12, thereby creating individual strips of web material 40 having a plurality of RFID devices 12 in a single in-line format as shown in FIG. 14. The individual strips of web material 40 may then be cut into individual RFID devices 12 as shown in FIG. 15. Alternatively, the individual strips 40 may be wound on rolls for use at a remote location where the roll may be unwound and the strip 40 of RFID devices may be cut into individual RFID devices 12.

Turning now to FIG. 16, a system is shown for producing an RFID device according to the embodiment depicted in FIG. 6. In this embodiment, a web material 10 having an electrically-conductive layer or material 14 and an electrically-insulating layer or substrate 16, is shown. The web material 10 passes through a transverse creasing mechanism 60 that forms transverse creases 42 in the web material 10 at predetermined intervals. The transverse creasing mechanism 60 may be a pair of clamping jaws, or any other device capable of suitably creasing the web. The creases 42 include a central portion of overlapping web material extending outwardly from the conductive layer 14. A suitable adhesive or heat and pressure crimping may be applied to the web at this stage to maintain the crease structure.

The web material 10 with transverse creases 42 then passes through a strap application device 70 where straps 22 are applied with a suitable adhesive to the web material 10 across the creases 42 and coupled to the conductive layer 14 on each side of the crease 42. A plurality of straps 22 may be placed across each crease 42, as shown in FIG. 6, to maximize manufacturing efficiency. Any conventional strap application device may be used to apply the straps to the web material. For instance, as shown in the figures, the straps 22 may be transferred to the web material 10 from a separate web of material 23. As will be described in further detail below, an advantage of this method is that the web material 10 and the web material 23 containing the straps 22 do not require indexing. No indexing is required because the antenna portions 24, 26 of an RFID device 12 are not formed until the RFID device 12 is separated from the web material 10. Thus, the straps 22 may be applied to the web 10 adjacent to one another or spaced apart at any desired interval. Further, a placement station may be used to place the straps 22 across the creases 42. Alternatively, it will be appreciated that other methods may be used to couple the RFID chips 22, or straps, to the web material 10. For example, a suitable pick-and-place operation may be used to place the straps across the creases 42.

The web material 10 next passes through a crease cutting mechanism 80 where at least part of the central portion of overlapping web material is removed from the crease 42, thereby forming an aperture 20 in the conductive layer 14. It will be appreciated that at least a part of the central portion of overlapping web material 32 consisting of only the conductive layer 14 must be removed to create an aperture 20 in the conductive layer 14. After removal, the aperture 20 in the conductive layer or material 14 exists where the dielectric material 16 separates the conductive layer or material 14.

The web material 10 now comprises a plurality of rows of RFID devices 12 extending across the width of the web material 10 and arranged in an end-to-end configuration along the length of the web material 10 as seen in FIG. 6. The web material 10 may then be passed through a set of cutter wheels 90. The cutter wheels 90 are arranged to cut the web material 10 in the longitudinal direction between the rows of end-to-end aligned RFID devices 12, thereby creating individual strips of web material 40 having a plurality of RFID devices 12 in a single in-line format. The individual strips of web material 40 may then be cut into individual RFID devices 12. Alternatively, the individual strips may be taken up on rolls 74 as seen in FIG. 16.

Turning to FIG. 17, a web 10 of RFID devices 12 according to another embodiment of the present invention is shown. The web material includes an electrically-conductive layer or material 14 and an electrically-insulating layer or substrate 16. In this embodiment, the RFID devices 12 are oriented in the transverse direction 34 of the web material 10. A single crease 42 extends along the length of the web material. An aperture 20 in the conductive layer 14 extends along the length of the web material 10 in the longitudinal direction 36. A plurality of RFID chips 22, or straps, are attached to the web material 10 across the aperture 20, and electrically coupled to the conductive layer 14. The aperture 20 is formed by creasing the web material 10 thereby creating a central portion of overlapped web material 32 between adjacent portions of single ply web material. The central portion of overlapped web material 32 includes a portion wherein the dielectric layer 16 has been folded upon itself. At least a part of the central portion of overlapping web material 32 is then removed, forming the aperture 20 in the conductive layer 14.

Specifically, the removal of at least part of the central portion of overlapping web material 32 creates an aperture 20 in the conductive layer 16. The aperture 20 in the conductive layer 16 is formed by removing the lower portion of the overlapping web material, leaving the central portion 32 where the dielectric layer 16 is folded upon itself separating the conductive layer 14. In this manner two separate antenna portions 24 and 26 are formed on either side of the aperture 20 when the RFID device 12 is cut from the web material 10.

In this embodiment, the RFID devices 12 are oriented in the transverse direction of the web adjacent to one another along the length of the web material 10 shown in FIG. 2. To form individual RFID devices 12, or tags, the web material 10 may be cut along the transverse axis 34 at lines C, thereby forming individual RFID tags 12 as shown in FIG. 18.

Figure 19:
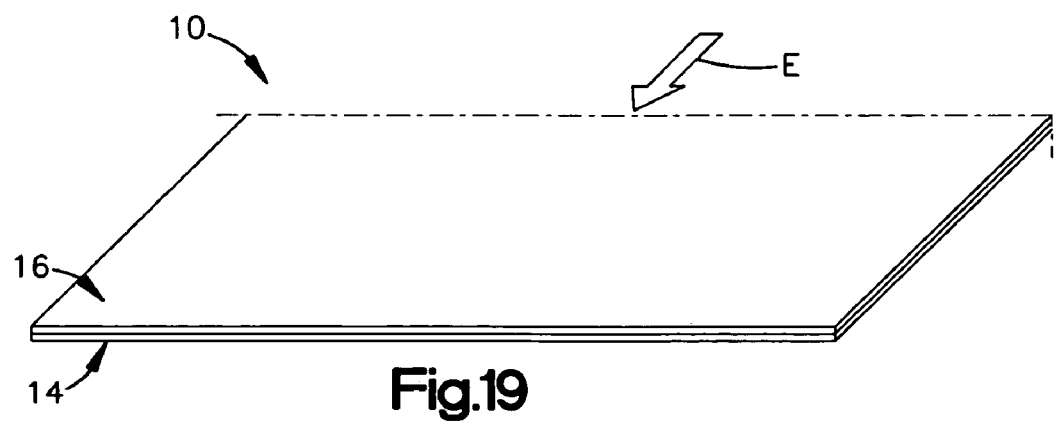
FIG. 19 is an oblique view of a sheet of web of material.
Figure 20:
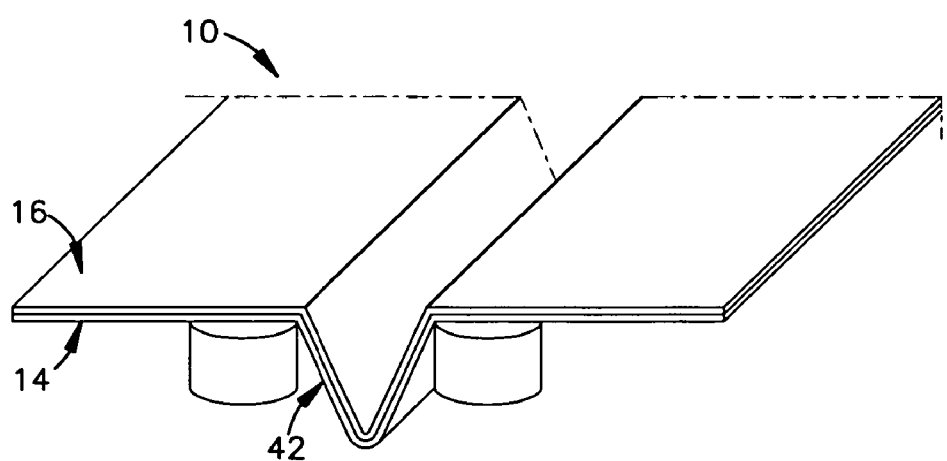
FIG. 20 is an oblique view of a partially longitudinally creased web material.

Turning now to FIGS. 19–24, a method for making RFID devices according to the embodiment shown in FIG. 17 is shown. Looking initially to FIG. 19, a web material 10 having a continuous conductive layer 14 and a continuous dielectric layer 16 is shown. In FIG. 20, a crease 42 is shown partially formed in the longitudinal direction 36 of the web. In the illustrated embodiment a single crease is shown, however, a plurality of longitudinal creases may be formed as appropriate to maximize the efficiency of the manufacturing process.

Figure 21:
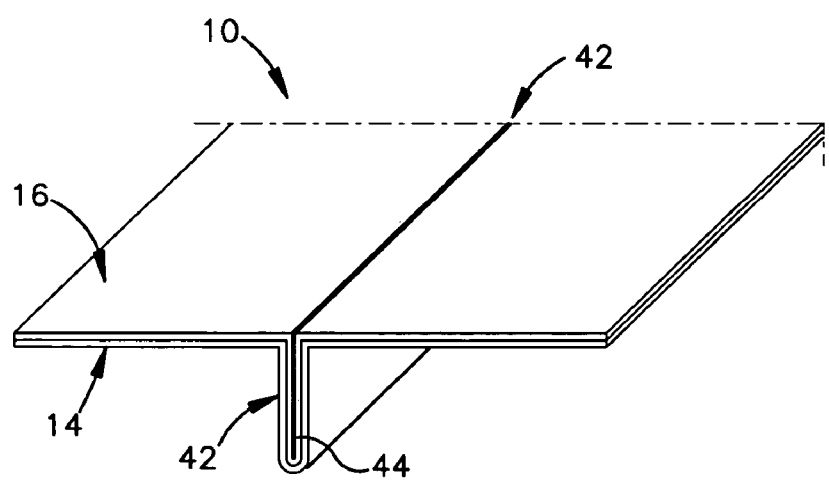
FIG. 21 is an oblique view of a fully creased web material.
Figure 22:
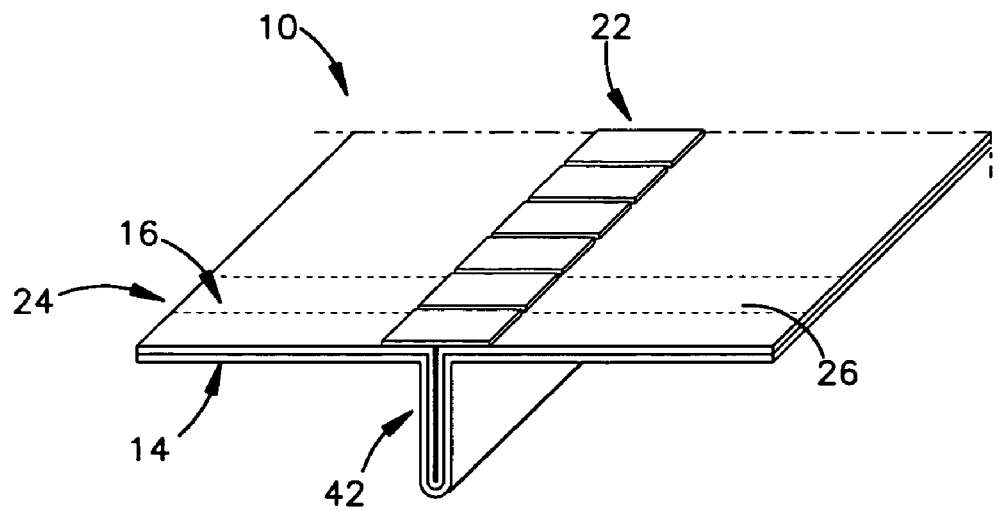
FIG. 22 is an oblique view of a fully creased web material with straps.

As shown in FIG. 21, the longitudinal crease 42, including a central portion of overlapped web material 44 between adjacent portions of single ply web material, is fully formed. This structure may be held together by a suitable adhesive or crimped with heat and pressure. RFID chips 22, or straps, are then applied across the crease 42 and coupled to the conductive layer 14 on each side of the crease 42 as shown in FIG. 22. The straps 12 are typically applied over the entire length of the web as appropriate to maximize manufacturing efficiency, and are attached to the web with a suitable adhesive.

Figure 23:
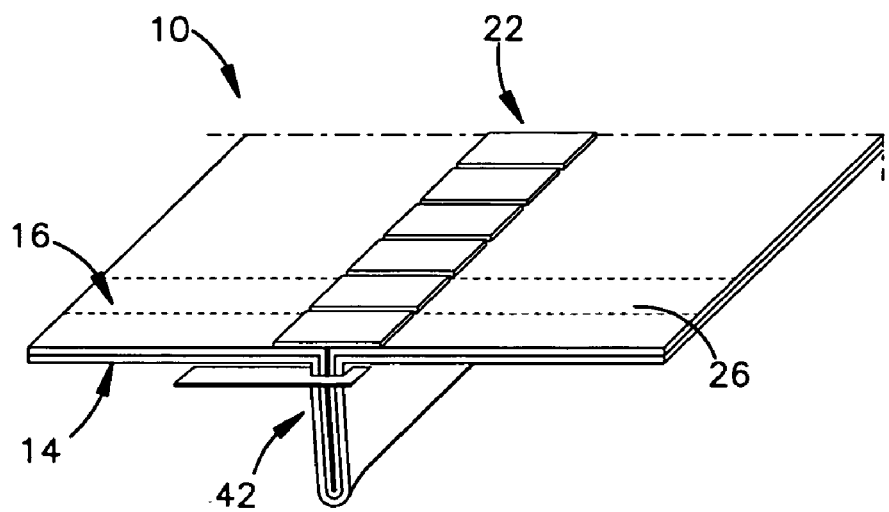
FIG. 23 is an oblique view of a web material wherein the crease is being cut to form an aperture in the conductive layer.
Figure 24:
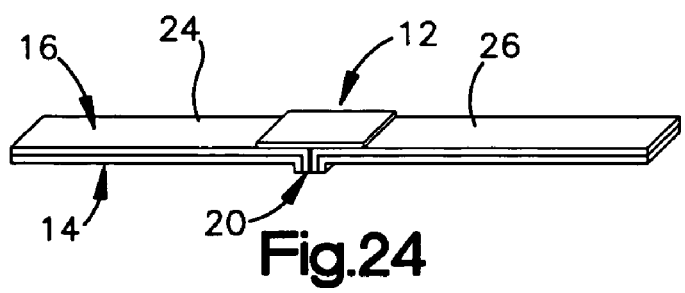
FIG. 24 is an oblique view of a single RFID device according to the present invention.

Turning to FIGS. 23 and 24, an aperture in the conductive layer 14 is formed by removing at least part of the central portion of overlapping web material 32. A sufficient amount of the central portion of overlapping web material 32 may be removed such that the remaining central portion of overlapping web material is flush with the conductive layer 14. However, only the lowermost part of the central portion of overlapping web material 32 consisting of part of the conductive layer 14 need be removed to create the aperture 20 in the conductive layer 14 as seen in FIG. 24.

The web material 10 now comprises a plurality of RFID devices 12 extending across the width of the web material as seen in FIG. 17. The web material 10 may be cut transversely at C between adjacent straps, thereby producing individual RFID devices 12 as shown in FIG. 24. Alternatively, the web 10 may be wound on a roll for use at a remote location where the roll will be unwound and the strip of RFID devices will be cut into individual RFID devices 12.

Figure 25A:
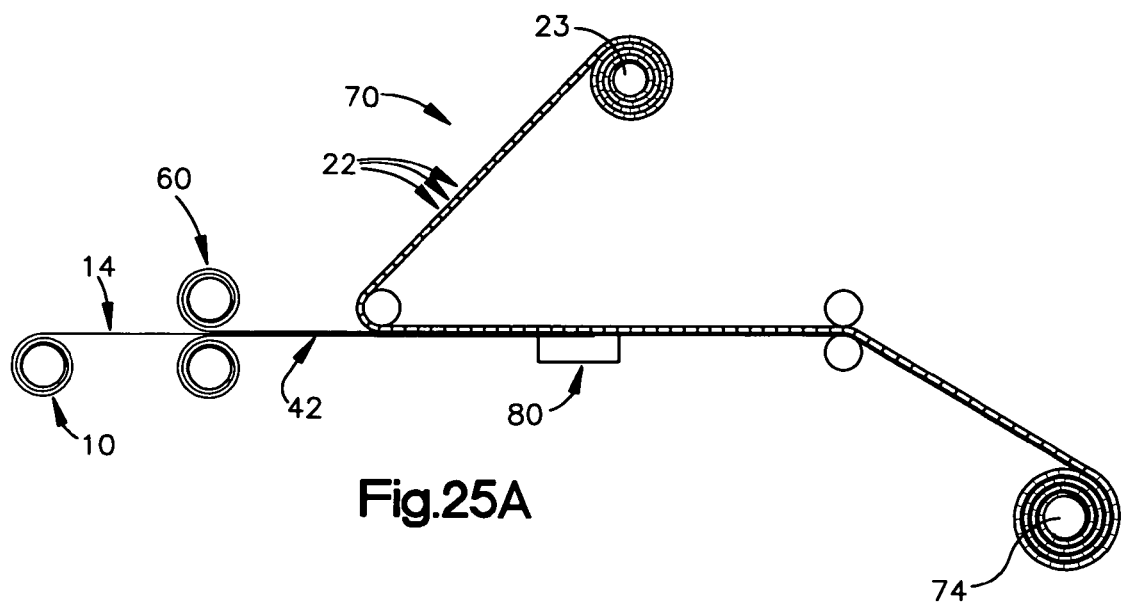
FIG. 25A shows a system for making a web of RFID devices as in FIG. 17.

Turning now to FIG. 25A, a system for producing an RFID device according to the embodiment of FIG. 17 is shown. A roll of web material having an electrically-conductive layer or material 14 and an electrically-insulating layer or substrate 16, is shown. The web material 10 passes through a longitudinal creasing mechanism 60. The longitudinal creasing mechanism 60 forms at least one crease 42 in the longitudinal direction of the web material. The crease 42 includes a central portion of overlapping web material extending outwardly from the conductive layer 14. A suitable adhesive or heat and pressure crimping may be applied to the web at this stage to maintain the crease structure.

The longitudinally creased web material 10 then passes through a strap application device 70 where straps 22 are applied with a suitable adhesive, such as a pressure sensitive adhesive, to the web material 10 across the crease 42 and coupled to the conductive layer 14 on each side of the crease 42. Any conventional strap application device may be used to apply the straps to the web material. For instance, as shown in the figures, the straps 22 may be transferred to the web material 10 from a separate web of material 23.

Figure 25B:
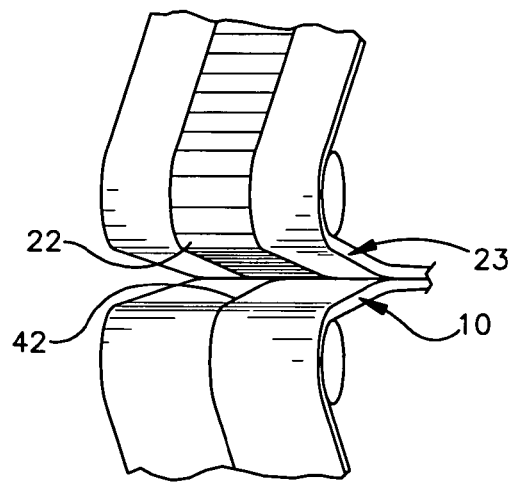
FIG. 25B shows an oblique view of straps being applied.

As stated previously, an advantage of this method is that the web material 10 and the web material 23 containing the straps 22 do not require indexing because the antenna portions 24, 26 of an RFID device 12 are not formed until the RFID device 12 is separated from the web material 10. Thus, the straps 22 may be applied to the web 10 adjacent to one another to maximize efficiency or may be spaced apart at any desired interval. In FIG. 25B, a web 10 having a longitudinal aperture 42 and a web 23 including straps 22 is shown. For illustration purposes, the webs 12, 23 are shown from a vantage point looking down the length of the webs towards the point of transfer of the strap 22 to the web 10. As seen in FIG. 25B, the straps 22 may be transferred from web 23 to web 10 without the need to index the webs 10, 23. This is possible because the antenna portions 24, 26 of each RFID device 12 are not formed until the RFID device 12 is separated from the web 10.

Alternative means of applying the straps, such as a placement station, may also be used to place the straps or interposers 22 across the creases 42 at any desired interval. It will be appreciated that other alternative methods may be used to couple the RFID chips, or straps, to the web material 10. For example, a suitable pick-and-place operation may be used to place the straps across the creases 42.

The web material 10 next passes through a crease cutting mechanism 80 where at least part of the central portion of overlapping web material is removed from the crease 42. An aperture 20 in the conductive layer 14 is thereby formed where the insulating material 16 separates the conductive material 14. It will be appreciated that at least the part of the overlapping center portion consisting of only the conductive layer 14 must be removed to create an aperture 20 in the conductive layer 14.

Once the web material 10 passes through the crease cutting mechanism 80, the web material 10 comprises a plurality of RFID devices 12 extending across the width of the web material as seen in FIG. 17. The web material may be divided transversely thereby creating individual RFID devices as shown in FIG. 18 or the web may be taken up on a roll as seen in FIG. 19.

Figure 26A:
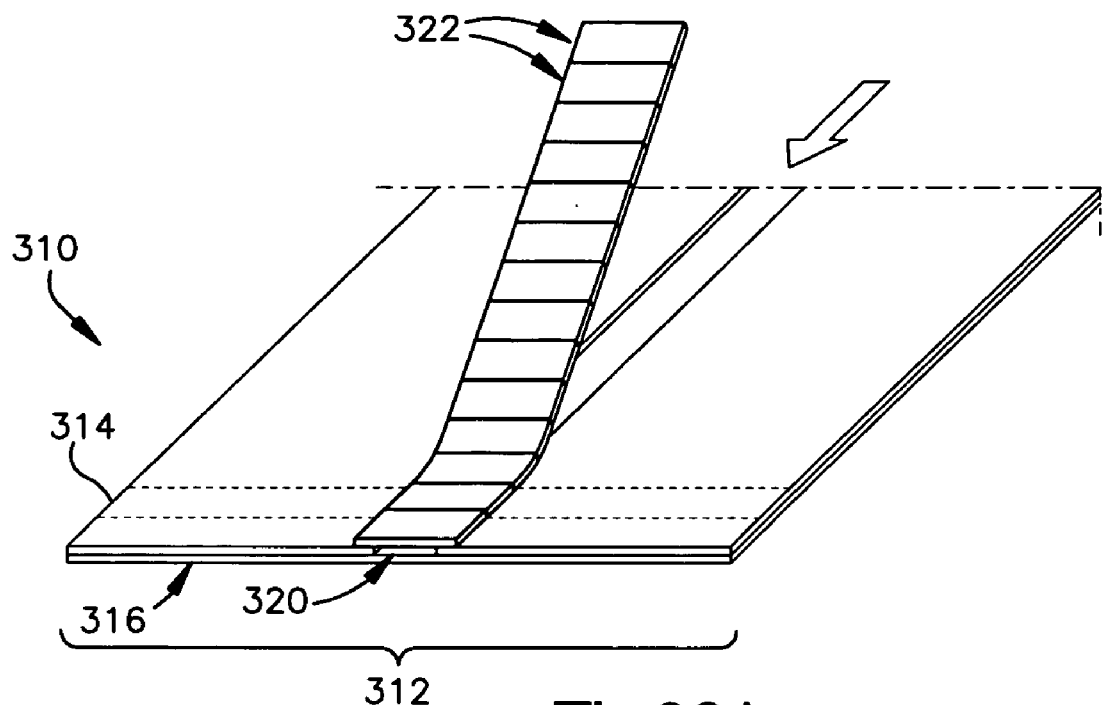
FIG. 26A is an oblique view of a strip of straps being laminated to a web material across an aperture in the conductive layer of the web material.

Another embodiment of the RFID device of the present invention is shown in FIG. 26A. A web material is shown at 310. The web material 310 includes a continuous dielectric layer 316 and a conductive layer 314. The conductive layer 314 has an aperture 320 extending the length of the web material 310 in the longitudinal direction. A plurality of straps 322 are laminated to the web material 310 across the aperture 320 and coupled to the conductive layer 314 on each side of the aperture 320.

The apertures 320 in the conductive layer 314 may be produced using suitable roll operations, such as those described previously, or other conventional methods. For example, an aperture may be formed by masking a conductive layer so as to leave a strip of exposed conductive material and then, using a chemical evaporation process, removing the strip of unmasked conductive layer thereby forming an aperture in the conductive layer. Alternatively, an adhesive backed conductive layer with a release liner may be used wherein a strip of the conductive layer is cut and removed, thereby forming an aperture in the conductive layer. Further, a web of dielectric material may be laminated with a conductive layer, wherein the laminating the conductive layer includes laminating two parallel aligned conductive layers to the dielectric layer with an aperture between the two conductive layers.

In the embodiment shown in FIG. 26A, the RFID devices 312 are aligned in the transverse direction of the web material 310, and adjacent to one another along the length of the web material 310. To form an individual RFID device 312, the web material 310 is split along the transverse axis of the web material between each strap 322 thereby forming individual RFID devices 312 having antenna portions 324 and 326.

A plurality of apertures 320 in the conductive layer 314 may be used to maximize manufacturing efficiency. In such case, a plurality of apertures 320 in the conductive layer 314 extend the length of the web material 310, and a plurality of straps 322 are attached to the web material 310 across each aperture 320. The web material 310 is then sliced in the longitudinal direction at appropriate intervals between the apertures 320 thereby forming individual webs of RFID devices, wherein the RFID devices 12 extend across the width of the individual webs.

Alternatively, apertures in the conductive layer may be formed in the transverse direction of the web. In such case, at least one strap is placed across each aperture. In this embodiment, a web of RFID devices is formed with the devices aligned adjacent to each other across the width of the web, and end-to-end along the length of the web. To form an individual RFID device, the web material is cut along the longitudinal axis at dashed lines A thereby forming a plurality of strips of RFID tags interconnected in an end-to-end arrangement as shown in FIG. 20. The strip of end-to-end aligned RFID devices are then cut into individual RFID devices.

Figure 26B:
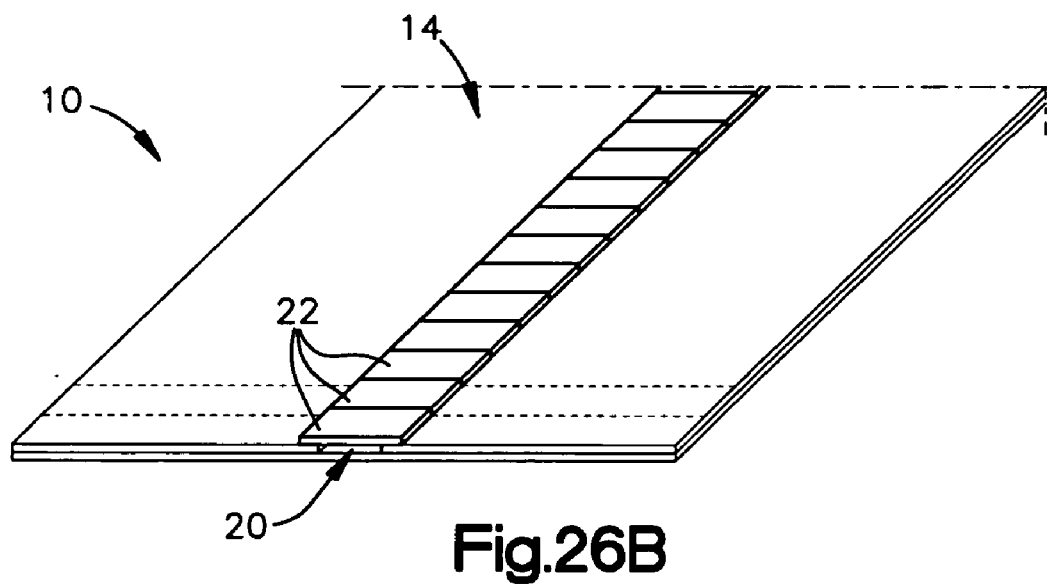
FIG. 26B is an oblique view of a web of RFID devices according to another embodiment of the present invention.

It will be appreciated that a web of RFID devices according to the present invention may also be produced from a web of conductive material. In FIG. 26B, a web of RFID devices is shown at 10. In this embodiment, an aperture 20 in the conductive layer 14 is formed by any of the methods of the present invention. A strap 22 is placed across the aperture 20 and is connected to the conductive layer 14 on each side of the aperture 20. A non-conductive adhesive may be used to bond the conductive layer together while maintaining the aperture 20 in the conductive layer. Alternatively, a strap 22, when connected to the conductive layer 14 on each side of the aperture 20, may mechanically maintain the aperture 20 in the conductive layer 14.

In placing the straps or interposers 22 on the web of conductive material, it will be appreciated that it is important to achieve a proper match between the pitch of the straps 22 and the pitch of the attachment or connect points (coupling points) of the straps or interposers 22 on the conductive material. By matching the pitch of the straps or interposers 22 with the desired spacing of RFID devices on the web, the need for additional fabrication steps and/or complications, such as changing the speed of a carrier holding the straps or interposers 22, may be avoided.

It will be appreciated that by use of a continuous web of conductive material, there may be less of a need for precise placement of the straps or interposers 22, when compared with placement of straps or interposers on individual, already defined, conductive antenna elements.

Figure 27:
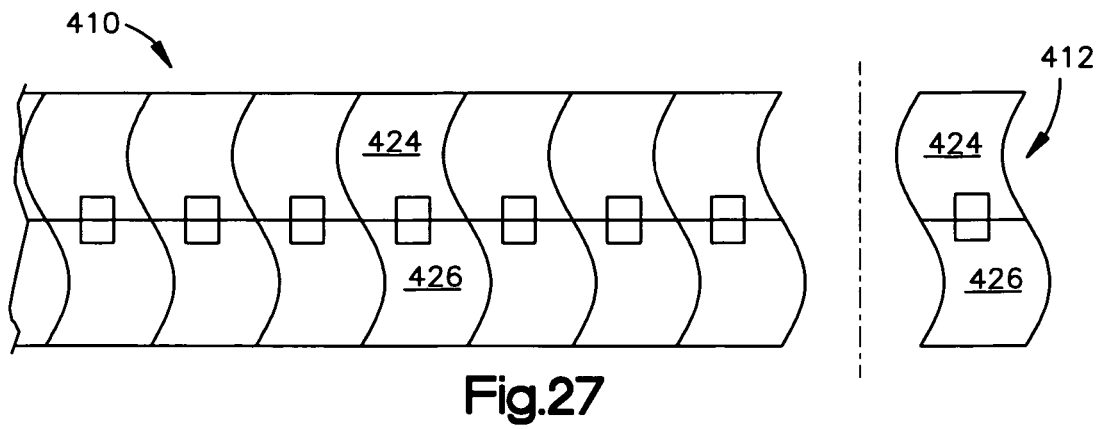
FIG. 27 is a top view of a web of RFID devices.

Turning to FIG. 27, a web of RFID devices 400 is shown with the RFID devices arranged across the width of the web. As shown previously, a web of RFID devices of this nature may be cut straight across the transverse axis of the web to form rectangular shaped RFID tags. In addition, it will be appreciated that the web 410 of RFID devices 412 may be cut across the transverse axis 434 of the web in any desirable pattern. For example, a sinusoidal transverse cut may be used to produce RFID tags 412 having a sinusoidal shape as shown in FIG. 22. Similarly, a delta shape RFID tag may be created by a delta shape transverse cut. Thus, any RFID tag of any desired shape may be formed. However, tessellating shapes are most advantageous because little or no web material is wasted.

Figure 28:
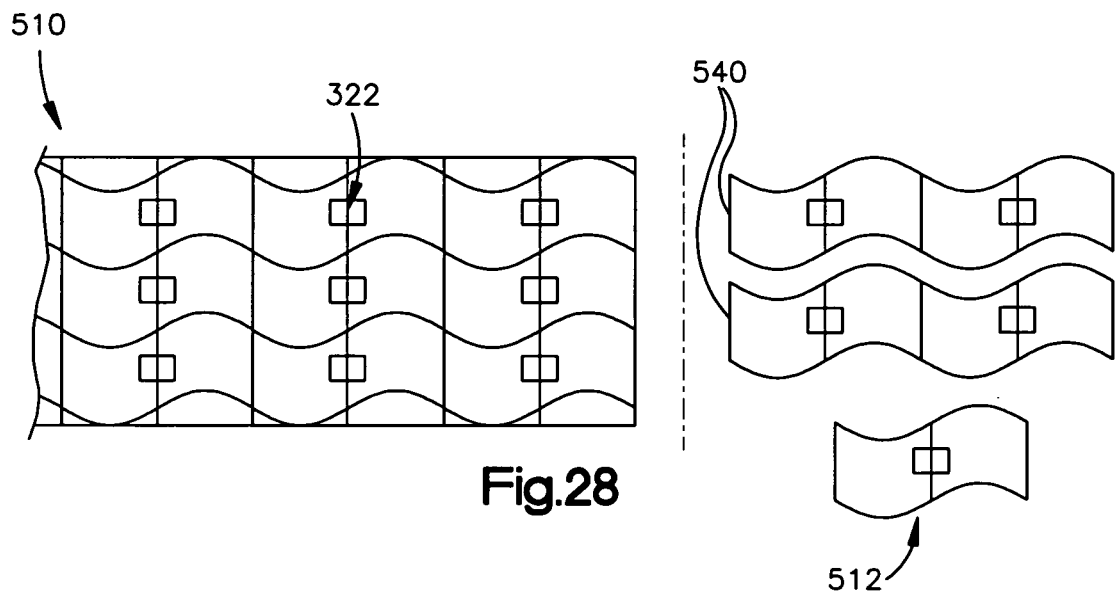
FIG. 28 is a top view of a web of RFID devices.

In a similar manner, the web 510 of RFID devices 512 shown in FIG. 28 may be cut to form any desired shape of RFID tags 512. The web 510 shown in FIG. 28 comprises a plurality of rows of RFID devices 512 extending across the width of the web material 510 with the individual RFID devices 512 arranged in an end-to-end configuration along the length of the web material 510. As previously discussed, cutter wheels cut the web material into a plurality of strips 540 of end-to-end aligned RFID devices 512. RFID devices of any desired shape may be made by configuring the cutter wheels to cut the web material 510 into strips of the desired shape. As seen in FIG. 28, the web material 510 is cut into strips 540 having a generally sinusoidal edge shape. Again, while any desired shape of RFID device may be produced, tessellating shapes are advantageous because little or no web material is wasted.

Figure 29:
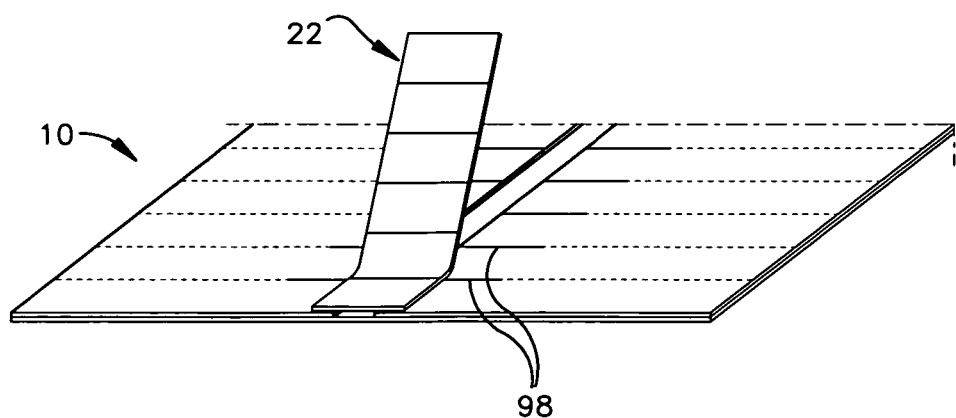
FIG. 29 is view of a web of RFID devices with slits on each side of an RFID device.
Figure 30:
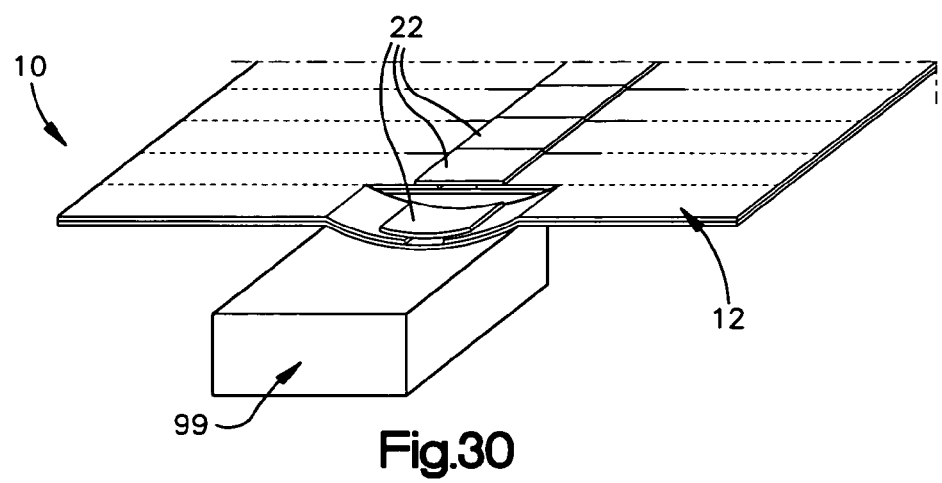
FIG. 30 is an oblique view of an RFID testing/programming assembly.

Turning now to FIGS. 29 and 30, a method of testing and/or programming the RFID tags before separating the RFID tags from the web of RFID devices 10 will be described. The web of RFID devices 10 shown in FIG. 29 may be a web of devices according to any embodiment of the present invention, or any web of RFID devices in general. As shown at 98, a slit is made in the web material on each side of the RFID chip 22 to be tested and/or programmed. In the illustrated embodiment the slits 98 are in the transverse direction of the web material, parallel to the longitudinal direction of the RFID tags. The length of the slits 98 may vary according to the properties and dimensions of the web material and RFID devices. However, the slits 98 will be of sufficient length to permit the central portion of the RFID device 12, including the RFID strap 22, to be deflected from the plane of the web of RFID devices 10 when the tension of the web in the transverse direction is decreased. A deflecting mechanism 99, as shown in FIG. 30, deflects the central portion of the RFID device 12 from the plane of the web of RFID devices 10 by suction or other means of deflection. Once the central portion of the RFID device 12 is deflected, the RFID device 12 can be tested and/or programmed by a testing and/or programming device 99. Once the testing and/or programming is complete, the deflecting mechanism 99 allows the central portion of the RFID device 12 to return to its original position in the plane of the web of RFID devices 10. The web of tested and/or programmed RFID devices 10 may then be taken up on a roll.

Figure 31:
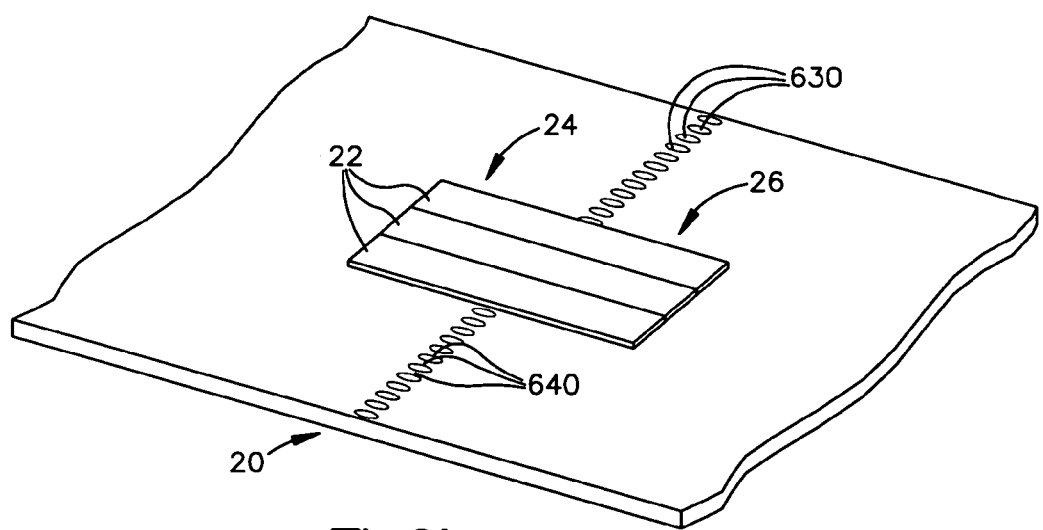
FIG. 31 is an oblique view of yet another web of RFID devices in accordance with the present invention.

FIG. 31 shows another configuration, in which the aperture 20 includes a series of openings 630 only partially separating the conductive material of the antenna elements 24 and 26. Conductive bridges 640 between the openings provide some conductive connection between the antenna elements 24 and 26. The conductive bridges 640 may serve to reduce possible static-electricity-related problems, such as static damage to electronics of a strap or interposer 22 coupled to the antenna elements 24 and 26, across the aperture 20. The openings 630 may be elliptical holes in the conductive material, as is illustrated in FIG. 31. The openings 630 may alternatively have other suitable shapes.

Certain modifications and improvements will occur to those skilled in the art upon a reading of the foregoing description. It should be understood that the present invention is not limited to any particular type of wireless communication device, or straps. For the purposes of this application, couple, coupled, or coupling is defined as either directly connecting or reactive coupling. Reactive coupling is defined as either capacitive or inductive coupling. One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of making an RFID device, the method comprising:
   providing a web material, the web material including a continuous conductive layer and a continuous dielectric layer;
   forming at least one aperture in the conductive layer; and
   applying at least one strap across the at least one aperture.

2. The method of claim 1, wherein the providing a web material further includes providing separate conductive and dielectric webs and combining the webs to provide the web material including a continuous conductive layer and a continuous dielectric layer.

3. The method of claim 1, wherein the at least one aperture extends in the longitudinal direction of the web material.

4. The method of claim 3, wherein the forming the at least one aperture includes:
   forming at least one crease portion in the longitudinal direction of the web material, the crease portion including a central portion of overlapped web material between adjacent portions of single ply web material; and
   removing at least part of the central portion of the at least one crease portion.

5. The method of claim 4, wherein the forming the at least one crease portion includes folding the web material into a T-shape cross-section.

6. The method of claim 4, wherein the forming the at least one crease portion further includes forming the central portion of overlapping web material with the dielectric layer of the web material adjacent to itself.

7. The method of claim 4, wherein the forming the at least one crease portion includes connecting the central portion of overlapping web material with an adhesive.

8. The method of claim 4, wherein the forming the at least one crease portion includes connecting the central portion of overlapping web material by crimping.

9. The method of claim 4, wherein the removing at least part of the central portion of the at least one crease portion includes cutting the central portion of overlapping web material along the longitudinal axis of the crease portion.

10. The method of claim 4, wherein the applying at least one strap includes using an adhesive.

11. The method of claim 1, further comprising dividing the web material into a plurality of discrete tessellated RFID devices by cutting the web material across the transverse axis.

12. The method of claim 1, further comprising dividing the web material into a plurality of discrete untessellated RFID devices by cutting the web material across the transverse axis.

13. The method of claim 1, further comprising dividing the web material into a plurality of discrete partially tessellated RFID devices by cutting the web material across the transverse axis.

14. The method of claim 1, wherein the at least one aperture extends in the transverse direction of the web material.

15. The method of claim 14, wherein the forming the at least one aperture includes:
   forming at least one crease portion in the transverse direction of the web material, the crease portion including a central portion of overlapped web material between adjacent portions of single ply web material; and
   removing at least part of the central portion of the at least one crease portion.

16. The method of claim 15, wherein the forming the at least one crease portion includes folding the web material into a T-shape cross-section.

17. The method of claim 15, wherein the forming the at least one crease portion further includes forming the central portion of overlapping web material with the dielectric layer of the web material adjacent to itself.

18. The method of claim 15, wherein the forming the at least one crease portion includes connecting the central portion of overlapping web material with an adhesive.

19. The method of claim 15, wherein the forming the at least one crease portion includes connecting the central portion of overlapping web material by crimping.

20. The method of claim 15, wherein the removing at least part of the central portion of the at least one crease portion includes cutting the central portion of overlapping web material along the longitudinal axis of the crease portion.

21. The method of claim 15, wherein the applying at least one strap includes using an adhesive.

22. The method of claim 14, further comprising dividing the web material into a plurality of discrete tessellated RFID devices by cutting the web material across the longitudinal axis.

23. The method of claim 14, further comprising dividing the web material into a plurality of discrete untessellated RFID devices by cutting the web material across the longitudinal axis.

24. The method of claim 14, further comprising dividing the web material into a plurality of discrete partially tessellated RFID devices by cutting the web material across the longitudinal axis.

25. The method of claim 1, wherein the forming the at least one aperture includes fully separating the conductive portions on either side of the at least one aperture.

26. The method of claim 1, wherein the forming at least one aperture includes leaving conductive bridges connecting conductive portions on either side of the at least one aperture.

27. The method of claim 26, wherein the applying includes applying the strap such that conductive portions operatively coupled to the conductive strap are electrically coupled by at least one of the conductive bridges.

28. The method of claim 26, wherein the forming includes making elliptical holes in the conductive layer.

29. The method of claim 1, wherein the applying includes applying plural straps across an aperture of the at least one aperture.

30. A web of RFID devices comprising:
   a web material having a conductive layer and a dielectric layer;
   at least one aperture in the conductive layer forming at least two separate conductor portions;
   plural straps attached across an aperture of the at least one aperture;
   wherein the straps are coupled to the conductor portions on respective opposite sides of the aperture.

31. A web of RFID devices according to claim 30, wherein the at least one aperture in the conductive layer extends in the transverse direction of the web, and wherein the at least one RFID device is oriented in the longitudinal direction of the web material.

32. A web of RFID devices according to claim 30, wherein the at least one aperture in the conductive layer extends in the longitudinal direction of the web, and wherein the at least one RFID device is oriented in the transverse direction of the web material.

33. A web of RFID devices according to claim 30, further comprising a plurality of RFID devices arranged in a tessellated configuration.

34. A web of RFID devices according to claim 30, further comprising a plurality of RFID devices arranged in a partially tessellated configuration.

35. A web of RFID devices according to claim 30, further comprising a plurality of RFID devices arranged in an untessellated configuration.

36. A web of RFID devices according to claim 30, further comprising a plurality of RFID devices separable from the web in a tessellated configuration.

37. A web of RFID devices according to claim 30, further comprising a plurality of RFID devices separable from the web in a partially tessellated configuration.

38. A web of RFID devices according to claim 30, further comprising a plurality of RFID devices separable from the web in an untessellated configuration.

39. A method of making RFID devices, the method comprising:
   providing a web of conductive material;
   forming at least one aperture in the web of conductive material; and
   applying plural straps at least one strap across an aperture of the at least one aperture.

40. The method of claim 39, wherein forming at least one aperture in the web material includes providing two webs of conductive material aligned in parallel with the aperture therebetween.

41. The method of claim 39, wherein the forming the at least one aperture includes:

forming at least one crease portion in the longitudinal direction of the web of conductive material, the crease portion including a central portion of overlapped web material between adjacent portions of single ply web material; and removing at least part of the central portion of the at least one crease portion.

42. The method of claim 41, wherein the forming the at least one crease portion includes folding the web material into a T-shape cross-section.

43. The method of claim 41, wherein the forming the at least one crease portion includes connecting the central portion of overlapping web material with a non-conductive adhesive.

44. The method of claim 41, wherein the removing at least part of the central portion of the at least one crease portion includes cutting the central portion of overlapping web material along the longitudinal axis of the crease portion.

45. The method of claim 41, wherein the applying at least one strap includes using an adhesive.

46. The method of claim 39, further comprising dividing the web material into a plurality of discrete tessellated RFID devices by cutting the web material across the transverse axis.

47. The method of claim 39, further comprising dividing the web material into a plurality of discrete untessellated RFID devices by cutting the web material across the transverse axis.

48. The method of claim 39, further comprising dividing the web material into a plurality of discrete partially tessellated RFID devices by cutting the web material across the transverse axis.

49. A web of RFID devices comprising:
a conductive web material;
at least one aperture in the conductive web material forming at least two separate conductor portions;
wherein the RFID devices include plural straps attached across an aperture of the at least one aperture and coupled to the conductor portions on respective opposite sides of the aperture.

50. A web of RFID devices according to claim 49, wherein the at least one aperture in the conductive web material extends in the longitudinal direction of the web, and the at least one RFID device is oriented in the transverse direction of the web material.

51. A web of RFID devices according to claim 49, further comprising a plurality of RFID devices arranged in a tessellated configuration.

52. A web of RFID devices according to claim 49, further comprising a plurality of RFID devices arranged in a partially tessellated configuration.

53. A web of RFID devices according to claim 49, further comprising a plurality of RFID devices arranged in a tessellated configuration.

54. A web of RFID devices according to claim 49, further comprising a plurality of RFID devices separable from the web in a tessellated configuration.

55. A web of RFID devices according to claim 49, further comprising a plurality of RFID devices separable from the web in a partially tessellated configuration.

56. A web of RFID devices according to claim 49, further comprising a plurality of RFID devices separable from the web in an untessellated configuration.

57. A method of testing RFID devices, comprising the steps of:
providing a web that includes the RFID devices;
cutting a slit in the web on opposite sides of one of the RFID devices, wherein the slits partially separate a central portion of the RFID device from other portions of the web;
deflecting the central portion of the RFID device from the plane of the web; and
testing the RFID device.

58. The method of claim 57, wherein the deflecting the central portion of the RFID device from the plane of the web includes using a vacuum to deflect the central portion.

59. The method of claim 57, wherein the testing the RFID device includes testing a plurality of RFID devices.

60. A method of programming RFID devices comprising the steps of:
providing a web that includes the RFID devices;
cutting a slit in the web on opposite sides of one of the RFID devices, wherein the slits partially separate a central portion of the RFID device from other portions of the web;
deflecting the central portion of the RFID device from the plane of the web; and
programming the RFID device.

61. The method of claim 60, wherein the deflecting the central portion of the RFID device from the plane of the web includes using a vacuum to deflect the central portion.

62. The method of claim 60, wherein the programming the RFID device includes programming a plurality of RFID devices.

* * * * *